W. S. MAYER.
DYNAMIC CONTROL.
APPLICATION FILED MAY 2, 1912. RENEWED FEB. 29, 1916.

Patented Apr. 4, 1916.

WITNESSES

INVENTOR
Walter S. Mayer
Attorney

UNITED STATES PATENT OFFICE.

WALTER S. MAYER, OF PHILADELPHIA, PENNSYLVANIA, ASSIGNOR TO NILES-BEMENT-POND CO., OF PHILADELPHIA, PENNSYLVANIA, A CORPORATION OF NEW JERSEY.

DYNAMIC CONTROL.

1,177,881. Specification of Letters Patent. Patented Apr. 4, 1916.

Application filed May 2, 1912, Serial No. 694,671. Renewed February 29, 1916. Serial No. 81,295.

*To all whom it may concern:*

Be it known that I, WALTER S. MAYER, a citizen of the United States, residing at Philadelphia, county of Philadelphia, and State of Pennsylvania, have invented a certain new and useful Dynamic Control, of which the following is a specification.

My invention relates to dynamic control of electric machines.

The invention is particularly adaptable to traveling crane motors and other motors similarly situated and could be applied in some instances to vehicle motors.

A principal object of the invention is to arrange the motor and controlling devices so that an effective electric braking effect is obtained to prevent improper acceleration of the load in certain cases, and in other cases to retard and finally stop the movement of the load after its propulsion has been discontinued.

Another object is to provide this braking effect in connection with a reversible motor which will drive the load and also brake it in either direction with equally good results. The invention could also be provided in a non-reversible form. That is, so that it would brake in only one direction. In this case the invention might be adaptable to hoisting mechanism, but in the reversible form the invention would be adaptable to the traversing mechanism of a crane, or like applications.

A further object of the invention is to provide in connection with a series machine in which the machine is always connected with the line on the braking as well as on the running points, an electro-mechanical brake which automatically becomes effective to stop the load in case the line current accidentally fails, when the controller is in any position except the off position.

A further object is to provide a mechanical circuit controller for an armature closed circuit for braking purposes, and to also make this circuit closing device "double acting" for a reversible motor.

A further object is to utilize the same resistance coils for the running and braking circuits, thus dispensing with separate coils for the armature closed circuit.

The foregoing and other characteristics and advantages of the invention will be sufficiently pointed out hereafter in connection with a detailed description of the accompanying drawing, which shows diagrammatically one exemplifying form of the invention.

Figure 1:
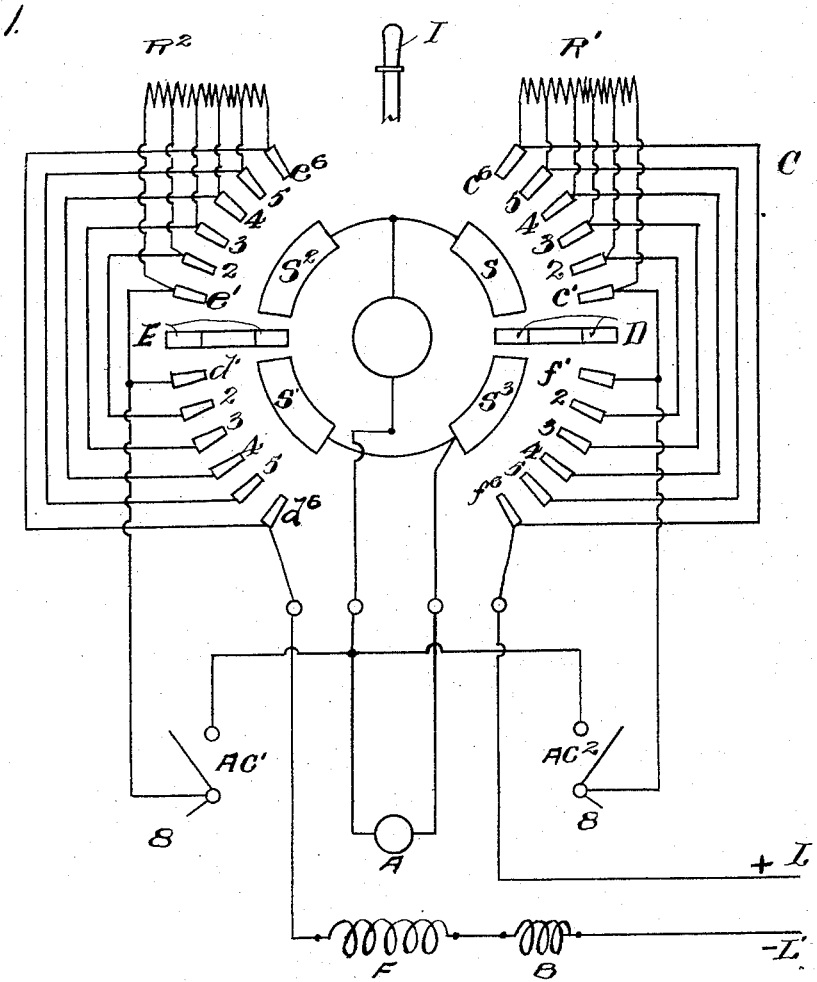
Figure 2:
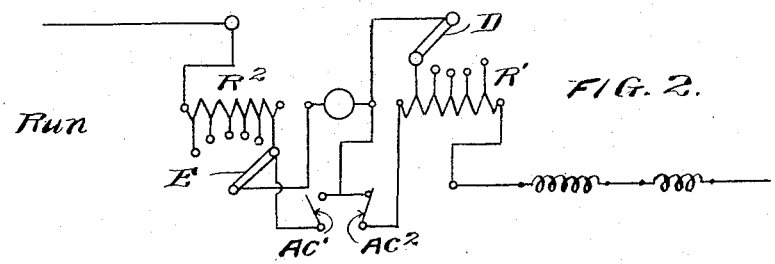
Figure 3:
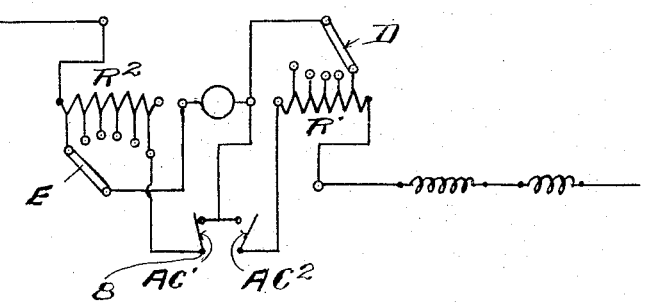
Figure 4:
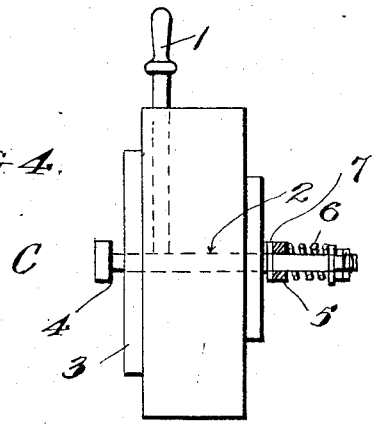
Figure 5:
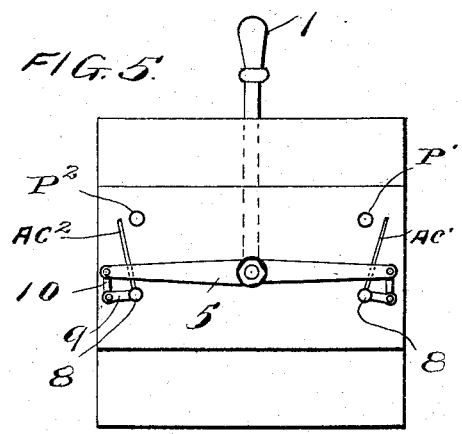

Figure 1 is a complete diagram of the motor and controller. Fig. 2 is a simplified diagram of the machine in running condition. Fig. 3 is a simplified diagram in braking condition. Fig. 4 is a side elevation partly in section, of the controller, and Fig. 5 is a rear elevation of the same.

Reference character C designates the controller in general.

1 is the controller handle mounted on shaft 2. The face plate 3 carries suitable brush contacts and segments which will be described, and arm 4 carried by the front end of the controller shaft carries brushes which make the connections. Conveniently at the rear, shaft 2 carries an arm 5 freely mounted but pressed by spring 6 against a shaft-flange 7. By this means the arm 5 is frictionally but not positively urged to move with shaft 2 in accordance with movement of the controller handle. Adjacent to the ends of arm 5 are movable contactors $AC'$, $AC^2$, each comprising a metallic contact arm, a pivot 8 through which the current may pass and an insulated arm 9 connected by a link 10 with the adjacent end of arm 5. The metallic contactors are adapted to engage fixed contacts $P'$, $P^2$. By this arrangement, evidently, as the controller handle is moved, for instance to the right in Fig. 5 if running in one direction, the first slight movement of the shaft 2 will be imparted to the arm 5 and the contactor $AC'$ will be moved at the same time to closed position in engagement with contact $P'$, while contactor $AC^2$ will at the same time be moved to open position away from contact $P^2$. Further movement of the controller handle for increasing speed in the same direction will now have no further effect upon the contactors, but as soon as the handle is moved back slightly toward the off position, the condition of each of the contactors will be reversed in an obvious manner; that is, contactor $AC'$ will immediately open and contactor $AC^2$ will immediately close. The purpose of this contactor movement will be explained.

On the face plate 3 (now see Fig. 1), contact segments S and $S'$ are for running in one direction and segments $S^2$ and $S^3$ are for running in the opposite direction. Cooperating with segment S are contacts $c'$ to $c^6$ inclusive, and coöperating with segment S' are contacts $d'$ to $d^6$ inclusive. Coöperating with segments $S^2$ are contacts $e'$ to $e^6$ inclusive, and coöperating with $S^3$ are contacts $f'$ to $f^6$ inclusive. Brushes D are carried at one end of the controller arm 4 (not shown in this figure) and brushes E are carried at the other end of the arm. At each end of the arm, the two brushes are electrically connected. A designates the armature, F a series field and B a coil in series with a field and armature for actuating the mechanical brake if the line current fails, as will be explained. L is the positive line, L' the negative line. R' designates a variable resistance connected at intervals with contacts $c'$ to $c^6$ and bridged across to contacts $f'$ to $f^6$. $R^2$ designates another resistance connected at progressive points to contacts $e'$ to $e^6$ and bridged across to contacts $d'$ to $d^6$.

The numerical suffixes 1 to 6 of characters designating the contacts $c$, $d$, $e$ and $f$ indicate running positions for running in either direction when the controller handle is moved away from the center or neutral point, and the same numerals indicate braking positions for the same running direction as the controller handle is moved back toward the center position. In one respect, therefore, the controlling mechanism is greatly simplified since a single manual device is made to control all the running and braking operations, and the same contacts, resistances and connections are made to serve for both the running and braking positions.

The operation will first be explained with reference to the simplified diagrams Figs. 2 and 3 and then the circuits will be sufficiently pointed out in connection with Fig. 1. To start the motor and its connected load in one direction, the controller handle is moved, say, to the left as in Fig. 1. This movement opens the contactor AC' and thus breaks the armature circuit for running in this direction. Contactor $AC^2$ is at the same time closed, but this simply makes a double circuit between the armature and the line at one side and does not affect the operation of the machine as shown in Fig. 2, which illustrates the running positions. On the first point the whole of resistances R', $R^2$ is placed in the series circuit and the armature starts slowly. Movement of the controller handle point by point cuts out both resistances simultaneously and progressively until on the sixth point the machine is direct in series on the line without any interposed resistance. The machine in this condition is substantially like an ordinary series machine except for the two variable resistances R' and $R^2$. While two are employed in order to secure the braking effects, which will be shortly described, they usually need not in the aggregate be larger or more expensive than an ordinary single bank of resistance.

Now, to discontinue the propulsive effort of the motor and to gradually retard the load, the controller handle is moved back toward the central position or back toward the right in Fig. 1 point by point. As soon as the controller handle begins to move back the condition of the movable armature contacts is reversed. That is, contact AC' is closed and contact $AC^2$ is opened. The opening of $AC^2$ has no effect for braking in this direction but the closing of contact AC' establishes a closed armature circuit as shown in Fig. 3, which illustrates the braking positions. This reversed armature circuit, as shown in Fig. 3, is from the left side of the armature through brushes E, through all of resistance $R^2$, to contact AC' and then through the armature. At the same time the resistance R' is entirely cut out of the line. To increase the braking effect, the controller handle is progressively moved back toward the center and the resistance $R^2$ is progressively cut out of the armature closed circuit, and at the same time the resistance R' is progressively and correspondingly cut into the line circuit until on the last braking point, corresponding to the first running point, the armature is completely short-circuited and comes to rest while the whole of resistance R' is inserted in the line. Movement of the controller handle to central position will now brake all connections and further movement toward the right will make running connections for the opposite direction of running similar in all respects to the foregoing description, except for the opposite action of the contacts AC', $AC^2$, and then upon return of the handle to central position braking will be effected for this direction of running, as above described.

It will be noticed that at all times when the controller is in running or braking position, the line circuit is closed and line current is depended upon for the proper operation of the machine. Therefore, if the line current should fail the load might drop, and to prevent this a brake coil B is inserted in series. This operates the mechanical brake so that when current is on the brake is withdrawn, but if the current fails the brake is automatically applied and holds the load. Complete circuits will now be traced with reference to Fig. 1. For running in one direction controller handle is moved to the left. Brushes D and E first connect $c'$ with segment S and segment S' with contact $d'$. The circuit is then from the positive line to contact $f^6$ to contact $c^6$, through the entire resistance R', to contact $c'$, to segment S, through a suitable blowout coil, through the armature to segment S³, to segment S', to contact d'. From this point a connection leads to contact AC' but the armature circuit is broken at this point by reason of the contact being in open position. From contact d' the circuit goes to contact e', through the entire resistance R², to contact e⁶, to contact d⁶, through field and brake, and so to the negative line.

Further movement of the controller in the same direction only serves to progressively cut out the resistance in an obvious manner. Upon returning toward the middle position for braking, however, the armature circuit is first closed at contact AC' and then the further return movement of the controller progressively cuts in the series resistance and cuts out the armature resistance—in this case the resistance R²—until the first position is again reached.

The circuits in the first braking position are as follows with reference to Fig. 1: The armature closed circuit, or shunt circuit about the armature, runs from the right-hand side of the armature to segment S³, to segment S', brushes E, to contact d⁶, to contact e⁶, to contact e', to contactor AC', which is now closed, and thence to the other side of the armature. The line circuit at the same time is from positive line L, to contact f⁶, to contact c⁶, brushes D, to segment S, through the armature to segment S³, to segment S', brushes E, to contact d⁶, and so through the field and brake to the negative line. Further movement of the controller handle toward the off position retains the contactor AC' closed and progressively inserts resistance in the closed armature circuit and the series circuit, as easily understood from Fig. 3.

For running in the opposite direction the controller handle is moved to the right and the circuits for this direction of running can easily be traced in view of the foregoing explanation.

I claim:—

1. The combination of an armature, a series field, a variable resistance, a circuit in shunt about the armature, and means including a controller for opening said shunt circuit and progressively cutting the resistance out of the line for running in either direction and for closing said shunt circuit and cutting resistance into the field circuit for braking in either of the running directions.

2. In an electric machine, the combination of an armature, a series field, variable resistance, a braking circuit in shunt about the armature, and means for opening said shunt circuit and connecting said armature and field in series and for variably inserting said resistance in series for running in either direction, and for closing said shunt circuit and variably inserting said resistance in said shunt circuit for braking.

3. In an electric machine, the combination of an armature, a series field, variable resistance, a braking circuit in shunt about the armature, and means for opening said shunt circuit and connecting said armature and field in series and for variably inserting said resistance in series for running in either direction, and for closing said shunt circuit and variably inserting said resistance in said circuit for varying coasting speed.

4. In an electric machine, the combination of an armature, a series field, variable resistance, a braking circuit in shunt about the armature, and means for opening said shunt circuit and connecting said armature and field in series and for variably inserting said resistance in series for running in either direction, and for closing said shunt circuit and variably inserting said resistance in said shunt circuit for braking.

5. In an electric machine, the combination of an armature, a series field, a braking circuit in shunt about said armature, two movable contactors in said brake circuit corresponding to different directions of movement, variable resistance, and means for actuating said contactors and variably inserting said resistance in series with the armature and field and in said braking circuit, whereby the armature may be driven at variable speeds in either direction or retarded with variable force in either running direction.

6. In an electric machine, the combination of an armature, a field, controller contacts, a movable controller member having brushes for said contacts, variable resistance and a braking circuit in shunt about said armature, said circuit including two movable contactors, suitable connections, and means by which movement of the controller member operates said contactors to cause variable speed driving of said armature in either direction or variable braking of said armature in either direction.

WALTER S. MAYER.

Witnesses:
SYDNEY BUCKLEY,
GEO. ELLWOOD BURTON.

Copies of this patent may be obtained for five cents each, by addressing the "Commissioner of Patents, Washington, D. C."